United States Patent
Bradshaw (10) Patent No.: US 12,503,035 B2
(45) Date of Patent: Dec. 23, 2025

(54) SECURING SYSTEM FOR A TRAILER

(71) Applicant: Towmate Trailers Ltd, Colchester (GB)

(72) Inventor: Stephen Bradshaw, Colchester (GB)

(73) Assignee: Towmate Trailers Ltd, Colchester (GB)

( * ) Notice: Subject to any disclaimer, the term of this patent is extended or adjusted under 35 U.S.C. 154(b) by 826 days.

(21) Appl. No.: 17/826,507

(22) Filed: May 27, 2022

(65) Prior Publication Data

US 2022/0281374 A1     Sep. 8, 2022

Related U.S. Application Data

(63) Continuation of application No. PCT/GB2020/053038, filed on Nov. 27, 2020, and a continuation of application No. PCT/GB2020/053037, filed on Nov. 27, 2020.

(30) Foreign Application Priority Data

Nov. 29, 2019  (GB) ...................................... 1917496
Feb. 28, 2020  (GB) ...................................... 2002876

(51) Int. Cl.
*B60P 7/08*    (2006.01)
*B60P 3/06*    (2006.01)
*B62D 63/08*   (2006.01)
*E02F 9/00*    (2006.01)

(52) U.S. Cl.
CPC ...... *B60P 7/08* (2013.01); *B60P 3/06* (2013.01); *B62D 63/08* (2013.01); *E02F 9/003* (2013.01); *B60P 3/062* (2013.01)

(58) Field of Classification Search
CPC .... B60P 7/08; B60P 7/06; B62D 63/08; E02F 9/003

USPC ........................................................ 410/120
See application file for complete search history.

(56) References Cited

U.S. PATENT DOCUMENTS

| | | |
|---|---|---|
| 6,981,835 B1 | 1/2006 | Groth |
| 2015/0027340 A1 | 1/2015 | Harman |
| 2018/0354401 A1 | 12/2018 | Johnson |

FOREIGN PATENT DOCUMENTS

| | | |
|---|---|---|
| AU | 2009101330 A4 | 1/2010 |
| GB | 2455636 A | 6/2009 |
| GB | 2486030 A | 6/2012 |
| GB | 2521252 A | 6/2015 |
| GB | 2552449 A | 1/2018 |

(Continued)

OTHER PUBLICATIONS

International Search Report and Written Opinion mailed Apr. 6, 2021 in corresponding International Application No. PCT/GB2020/053038.

(Continued)

*Primary Examiner* — Amy R Weisberg
*Assistant Examiner* — Philip Charles Adams
(74) *Attorney, Agent, or Firm* — Renner, Otto, Boisselle & Sklar, LLP.

(57) ABSTRACT

A securing system for securing an item of plant machinery to a trailer comprises a retainer disposed in a forward region of the trailer, the retainer comprising a recess for receiving a part of a dozer blade of said plant machinery, and the retainer being configured such that movement of a dozer blade engaged with the recess is restricted in forwards, rearwards and upwards directions relative to a floor of the trailer.

10 Claims, 8 Drawing Sheets

(56) References Cited

FOREIGN PATENT DOCUMENTS

GB         2556353 A    5/2018
WO    2019/242836 A1   12/2019

OTHER PUBLICATIONS

International Search Report and Written Opinion mailed Mar. 29, 2021 in corresponding International Application No. PCT/GB2020/053037.
Search Report mailed Apr. 27, 2020 in corresponding United Kingdom Application No. 1917496.0.
Search Report mailed Jul. 23, 2020 in corresponding United Kingdom Application No. 2002876.7.

SECURING SYSTEM FOR A TRAILER

RELATED APPLICATIONS

This application is a continuation of International Application No. PCT/GB2020/053037 filed Nov. 27, 2020, which claims priority to United Kingdom Application No. 1917496.0 filed Nov. 29, 2019, each of which is hereby incorporated herein by reference in its entirety. This application also is a continuation of International Application No. PCT/GB2020/053038 filed Nov. 27, 2020, which claims priority to both United Kingdom Application No. 1917496.0 filed Nov. 29, 2019, and United Kingdom Application No. 2002876.7 filed Feb. 28, 2020, each of which is hereby incorporated herein by reference in its entirety.

FIELD OF THE INVENTION

This invention relates to a securing system for a trailer and to a method of securing an item of plant machinery to a trailer. This invention relates, in particular, to a retainer for securing an item of plant machinery, such as an excavator, to a trailer. This invention also relates to a support structure for a trailer, and in particular to a support structure for a trailer for transporting an item of plant equipment such as an excavator. In preferred embodiments the support structure is configured for supporting a bucket secured to an arm of an excavator seated on the trailer. Also disclosed is a method of supporting a bucket attachment for an excavator on a trailer.

BACKGROUND TO THE INVENTION

It is known to secure excavators and the like to trailers for transportation. The excavator must be correctly secured to the trailer to prevent movement of the excavator on the trailer to reduce the likelihood of injury to persons or damage to equipment.

In some prior art methods, the undercarriage, and associated tracks and/or wheels, of the excavator is secured to the trailer using a plurality of straps, clips and other fastening devices. These straps and clips must each be located correctly and tightened by a user of the trailer to ensure that the excavator is safely attached to the trailer. There are a number of disadvantages of systems such as this, not least the need to carry and store a plurality of separate straps and clips, and the time needed to install and fasten the straps and clips when loading an excavator onto the trailer. There is also the possibility that one or more of the straps or clips may not be fastened correctly.

One known prior art system includes a pair of cowlings that are permanently attached to a floor of the trailer. When an excavator is loaded onto the trailer, a part of the undercarriage of the excavator locates under and between the cowlings. The cowlings are configured so as to prevent forward or upward movement of the excavator relative to the trailer, and also to substantially prevent sideways movement of the excavator.

A disadvantage of this system is that some excavators, in particular those having a dozer blade attached to a front of the undercarriage, can only be loaded onto the trailer in a rearward direction. In other words, the excavator must be loaded onto the trailer such that the undercarriage is travelling rearwardly, even if the cab of the excavator has been rotated to face forward (relative to the trailer). This can cause problems in some situations.

Additionally, excavators may be equipped with a number of different attachments or tools, such as buckets, breakers, rippers, augers and the like. It is often desirable to transport the required attachments or tools on the same trailer.

Often heavy and expensive, excavator attachments may cause damage if improperly secured in transit, and may be vulnerable to theft. Accordingly, attachments may be secured to a trailer using tie-down straps or similar. Securing attachments in this way to trailers may be time consuming and vulnerable to human error. Furthermore, it is often necessary to locate the attachment or tool in its storage location by hand, which may be difficult when the tool is large, heavy and often dirty.

In some circumstances the attachment remains secured to the excavator during transportation. In particular, it is known to transport excavators with a bucket attachment secured to the end of the arm of the excavator. Some prior art trailers include a bucket rest located in front of the bed of the trailer upon which the bucket may be seated or supported during transportation. The bucket rest typically comprises a shelf or platform having an upper surface on which the bucket is seated. The arm of the excavator may then be tied down using suitable securing straps. Accordingly, while the bucket rest may support at least some of the weight of the bucket, it is still necessary to secure the arm of the excavator against movement during transportation.

Against that background it would be desirable to provide an improved system for securing an excavator to a trailer. It is also desirable to provide an improved bucket rest for a trailer.

SUMMARY OF THE INVENTION

A first aspect of the present invention provides a method of securing an item of plant machinery to a trailer, the plant machinery comprising an undercarriage and a dozer blade, and the method comprising:

driving the plant machinery onto a floor of the trailer in a forwards direction with the dozer blade forwards of the undercarriage and with the dozer blade in a first position relative to the undercarriage, thereby to position the plant machinery in a transportation position on the trailer, in which the dozer blade is adjacent a retainer of the trailer; and engaging the dozer blade with the retainer by moving the dozer blade into a second position relative to the undercarriage, engagement of the dozer blade with the retainer restricting movement of the excavator in forward and rearward directions and restricting movement of the dozer blade in an upwards direction relative to the floor of the trailer.

The item of plant machinery may be an excavator, a skid steer loader or a dumper truck.

In preferred embodiments the retainer comprises a hook member, and the method step of engaging the dozer blade with the retainer comprises raising the dozer blade to engage an upper edge of the dozer blade in a recess of the hook member. The hook member preferably comprises an upright post and a projection extending from an upper end of the post, and the method step of driving the plant machinery onto a floor of the trailer into the transportation position preferably comprises driving the plant machinery into a position in which at least a part of the dozer blade is adjacent the upright post and under the projection. In preferred embodiments the method comprises raising the dozer blade after a part of the dozer blade has been positioned under the projection so as to locate the upper edge of the dozer blade in the recess.

In some preferred embodiments the projection of the hook member comprises a proximal portion and a distal portion, a first distance being defined between the proximal portion and the floor of the trailer and a second, smaller distance being defined between the distal portion and the floor of the trailer, and the method preferably comprises driving the plant machinery onto the trailer with the dozer blade in a lowered position such that the dozer blade passes under the distal portion of the projection and then, when the dozer blade is disposed under the proximal portion of the projection, raising the dozer blade.

The step of driving the plant machinery onto a floor of the trailer into the transportation position preferably comprises driving the plant machinery onto the floor of the trailer so that a part of the undercarriage of the plant machinery locates under a keeper of the securing system, the keeper being configured to limit upwards movement of the undercarriage relative to the floor of the trailer. The securing system preferably comprises two keepers, one on each side of the trailer, and the method preferably comprises driving the plant machinery onto the floor of the trailer so that a first part of the undercarriage locates under a first one of the keepers and a second part of the undercarriage locates under a second one of the keepers.

The undercarriage may comprise a first track and a second track, and in these embodiments the method preferably comprises driving the plant machinery onto the floor of the trailer so that a part of the first track locates under the first one of the keepers and a part of the second track locates under the second one of the keepers.

In preferred embodiments the or each keeper comprises a cover plate, and the method comprises, before driving the plant machinery onto the trailer, adjusting a position of the keeper so as to change a distance between the cover plate and the floor of the trailer.

The trailer may further comprise a storage cage seated on the floor of the trailer. In these embodiments the method preferably comprises, before or after driving the plant machinery onto the trailer, storing one or more pieces of equipment or attachments for the plant machinery in the storage cage.

The storage cage is preferably self-contained such that the storage cage can be lifted off the trailer with attachments and/or equipment retained within it. In these embodiments the method may further comprise placing the storage cage onto the trailer. The method may alternatively or additionally comprise lifting the storage cage off the trailer and placing the storage cage in a location remote from the trailer.

In preferred embodiments the trailer further comprises a breaker storage unit having an opening in a top wall. In these embodiments the method preferably comprises, after driving the plant machinery onto the trailer, inserting a breaker attached to the plant machinery into the breaker storage unit in a vertical direction. The method may then comprise detaching the breaker from an arm of the plant machinery.

In some embodiments the trailer may comprise a bucket rest and a projection that extends over a part of the bucket rest. In these embodiments the method preferably comprises, after driving the plant machinery onto the trailer, locating a bucket attached to the plant machinery on the bucket rest such that a part of the projection extends into an opening of the bucket. The projection may extend from or be a part of the breaker storage unit.

A second aspect of the present invention provides a securing system for securing an item of plant machinery to a trailer comprising:

a retainer disposed in a forward region of the trailer, the retainer comprising a recess for receiving a part of a dozer blade of said plant machinery, and the retainer being configured such that movement of a dozer blade engaged with the recess is restricted in forwards, rearwards and upwards directions relative to a floor of the trailer.

Preferably the item of plant machinery is an excavator, a skid steer loader or a dumper truck.

In preferred embodiments the retainer comprises a hook member including a recess configured to receive a part of an upper edge of the dozer blade when the dozer blade is raised into the second position. The hook member preferably comprises an upright post and a projection extending from an upper end of the post, the projection including the recess. In some embodiments the projection comprises a proximal portion and a distal portion, a first distance being defined between the proximal portion and the floor of the trailer and a second, smaller distance being defined between the distal portion and the floor of the trailer.

In preferred embodiments the retainer comprises a pair of hook members. A first one of the pair of hook members is preferably disposed proximate a first side of the trailer and a second one of the pair of hook members is preferably disposed proximate a second side of the trailer.

The securing system may further comprise a keeper configured such that, when the dozer blade of the plant machinery is engaged with the retainer, a part of an undercarriage of the plant machinery locates under a part of the keeper to limit upwards movement of the undercarriage relative to the floor of the trailer. The keeper may be one of a pair of keepers, a first one of the pair of keepers being disposed on a first side of the trailer and a second one of the pair of keepers being disposed on a second side of the trailer.

In preferred embodiments the or each keeper comprises a cover plate that, in use, extends over a part of the undercarriage of the plant machinery, and a mounting plate configured to engage with a part of the trailer to enable a position of the cover plate with respect to a floor of the trailer to be adjusted. The cover plate of the or each keeper is preferably elongate. The or each keeper may comprise a support frame from which the cover plate extends, and the mounting plate may be part of the support frame. In some embodiments the mounting plate is configured to engage with a support post of the trailer. The mounting plate may be engageable with the support post in a plurality of different positions.

The securing system may further comprise a storage cage seated on the floor of the trailer between a front wall of the trailer and the retainer. The storage cage may comprise a lower portion and a lid hingedly attached to the lower portion. The lower portion of the storage cage may include one or more flanges that engage with a corresponding one or more side walls of the trailer to secure the storage cage to the trailer.

In preferred embodiments the securing system further comprises a breaker storage unit having an opening in a top wall, the breaker storage unit being configured such that a breaker is insertable into the breaker storage unit in a vertical direction, and the breaker storage unit being disposed forward of the retainer. In embodiments also including a storage cage, the lid of the storage cage preferably comprises a recess or gap for receiving a part of the breaker storage unit when the lid is in an open position. In preferred embodiments the storage cage is disposed between the retainer and the breaker storage unit.

In some embodiments the securing system may further comprise a bucket rest and a projection that extends over a part of the bucket rest, the projection being spaced from the bucket rest such that, in use, when a bucket is seated on the bucket rest a part of the projection extends into an opening of the bucket. The projection may extend from a storage portion of the breaker storage unit.

Also disclosed is a trailer including the securing system described above.

The following description also discloses a storage cage for a trailer. In particular the storage cage comprises a lower portion and a lid hingedly attached to the lower portion. The lower portion of the storage cage may include one or more flanges that engage with a corresponding one or more side walls of the trailer to secure the storage cage to the trailer.

Also disclosed is a breaker storage unit for a trailer. The breaker storage unit has an opening in a top wall, such that the breaker storage unit is configured so that a breaker is insertable into the breaker storage unit in a vertical direction. In use after driving an item of plant machinery onto the trailer, a method may comprise inserting a breaker attached to the plant machinery into the breaker storage unit in a vertical direction. The method may then comprise detaching the breaker from an arm of the plant machinery.

Also disclosed is a bucket rest for a trailer. A projection preferably extends over a part of the bucket rest. The projection is preferably spaced from the bucket rest such that, in use, when a bucket is seated on the bucket rest a part of the projection extends into an opening of the bucket.

Also disclosed is a trailer including the storage cage, the breaker storage unit and/or the bucket rest.

A third aspect of the invention provides a support structure for an excavator attachment on a trailer, the support structure comprising:
  a platform having an upper surface on which a load may be supported in use;
  means for securing the platform to a part of a trailer adjacent a bed of the trailer; and
  a projection extending over the platform and being spaced from the platform such that a part of a load being supported by the platform may be disposed between the platform and the projection to limit movement of the load in a direction substantially perpendicular to a plane of the platform.

The platform is preferably perforated. This reduces the weight of the platform and allows a load supported on the platform to drain if required.

The means for securing the platform to a part of a trailer is preferably configured to secure the platform to a part of an A-frame of the trailer between a bed of the trailer and a hitch of the trailer. The means may include a pair of legs or struts spaced so as to connect to the A-frame. The means may comprise a pair of side panels extending from opposite side edges of the platform. The side panels may converge in a direction towards one end of the platform.

Figure 8:
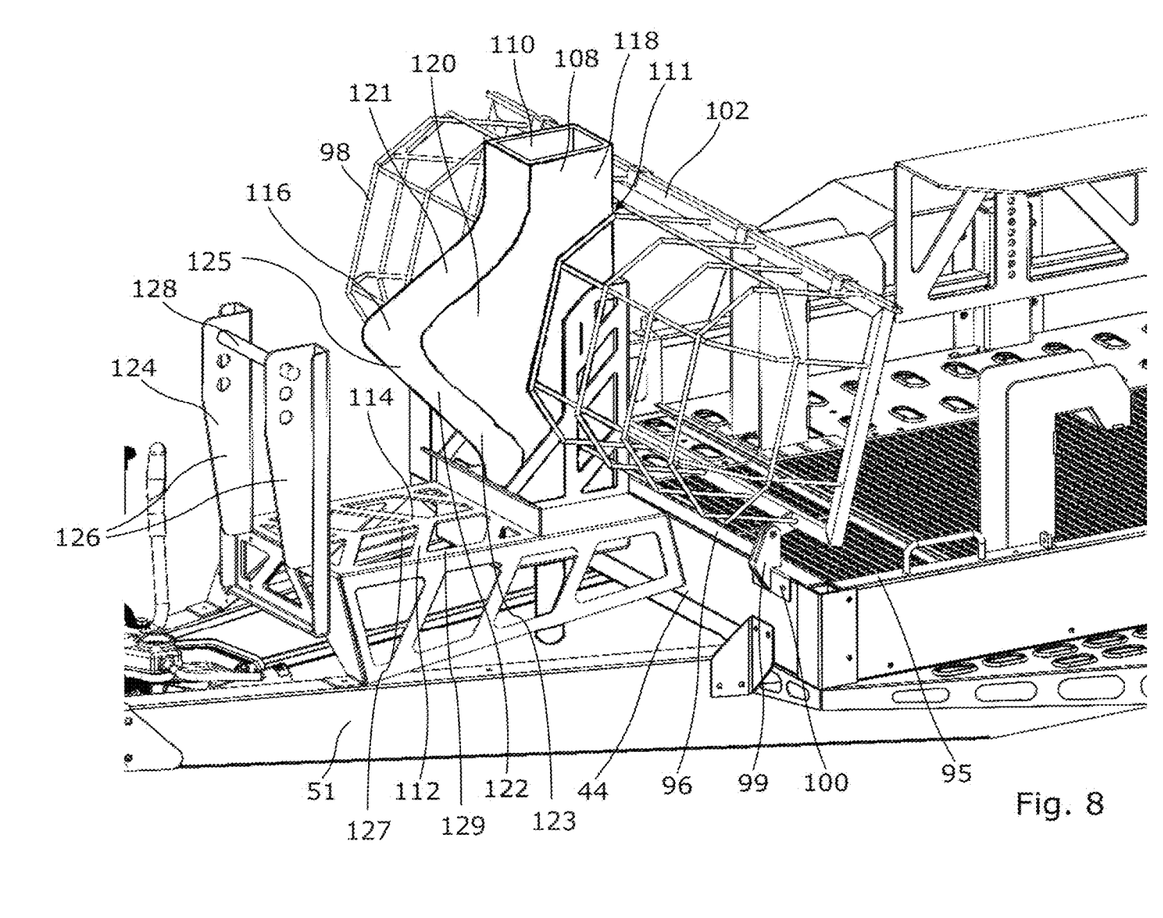
FIG. 8 is a further view of the storage cage, breaker storage and bucket rest of FIG. 5, with the lid of the storage cage in an open position.

In preferred embodiments the projection comprises a sloped lower wall such that a distance between a first part of the projection 123 (FIG. 8) and an edge region of the platform 129 (FIG. 8) is smaller than a distance between a second part of the projection 125 (FIG. 8) and a central region of the platform 127. (FIG. 8). The projection may further comprise a sloped upper wall, the upper wall and the lower wall converging such that the projection further comprises a pair of generally triangular side walls extending between the upper wall and the lower wall. The upper and lower walls may converge at a distal end of the projection.

In some embodiments the support structure may further comprise a storage portion for receiving an attachment for an excavator proximate an edge of the platform. The projection preferably extends from the storage portion. The storage portion may be configured to receive a breaker.

In preferred embodiments the support structure is a bucket rest.

A fourth aspect of the invention provides a trailer comprising:
  a frame including a hitch;
  a bed including a floor for supporting an item of plant machinery; and
  a support structure according to the third aspect of the invention disposed between the bed and the hitch.

The projection preferably extends over a rear edge of the platform adjacent the bed of the trailer and in a direction towards the hitch.

In some embodiments the trailer may further comprise a post projecting from an edge of the platform furthest from the bed of the trailer in a direction substantially perpendicularly to the plane of the platform. The post may be part of an arm hitch. The arm hitch preferably further comprises a retainer bar extending from the post.

A fifth aspect of the invention provides a method of transporting an excavator on a trailer, comprising:
  disposing an excavator on a floor of a bed of the trailer;
  lowering an arm of the excavator so that a bucket attached to an end of the arm contacts an upper surface of a platform disposed adjacent a front wall of the bed of the trailer; and
  maneuvering the arm and bucket of the excavator such that a projection extending over the platform and being spaced from the platform is received in the opening of the bucket, and bottom wall of the bucket is disposed between the projection and the platform, such that the projection limits movement of the bucket in a direction substantially perpendicular to a plane of the platform.

The step of disposing an excavator on a floor of the trailer preferably comprises driving the excavator onto the floor of the trailer.

The step of maneuvering the arm and bucket of the excavator preferably comprises rotating the bucket about an axis such that an edge of the bottom wall of the bucket passes a distal end of the projection and is inserted into a gap between the projection and the platform. In preferred embodiments a post projects from an edge of the platform furthest from the bed of the trailer in a direction substantially perpendicular to the plane of the platform. A distance between the post and the distal end of the projection is preferably less than a depth of the bucket.

Preferred and/or optional features of each aspect and embodiment described above may also be used, alone or in appropriate combination, in the other aspects and embodiments also.

BRIEF DESCRIPTION OF THE DRAWINGS

The invention will now be further described by way of example only and with reference to the accompanying drawings, in which.

DESCRIPTION OF THE PREFERRED EMBODIMENTS

Figure 1:
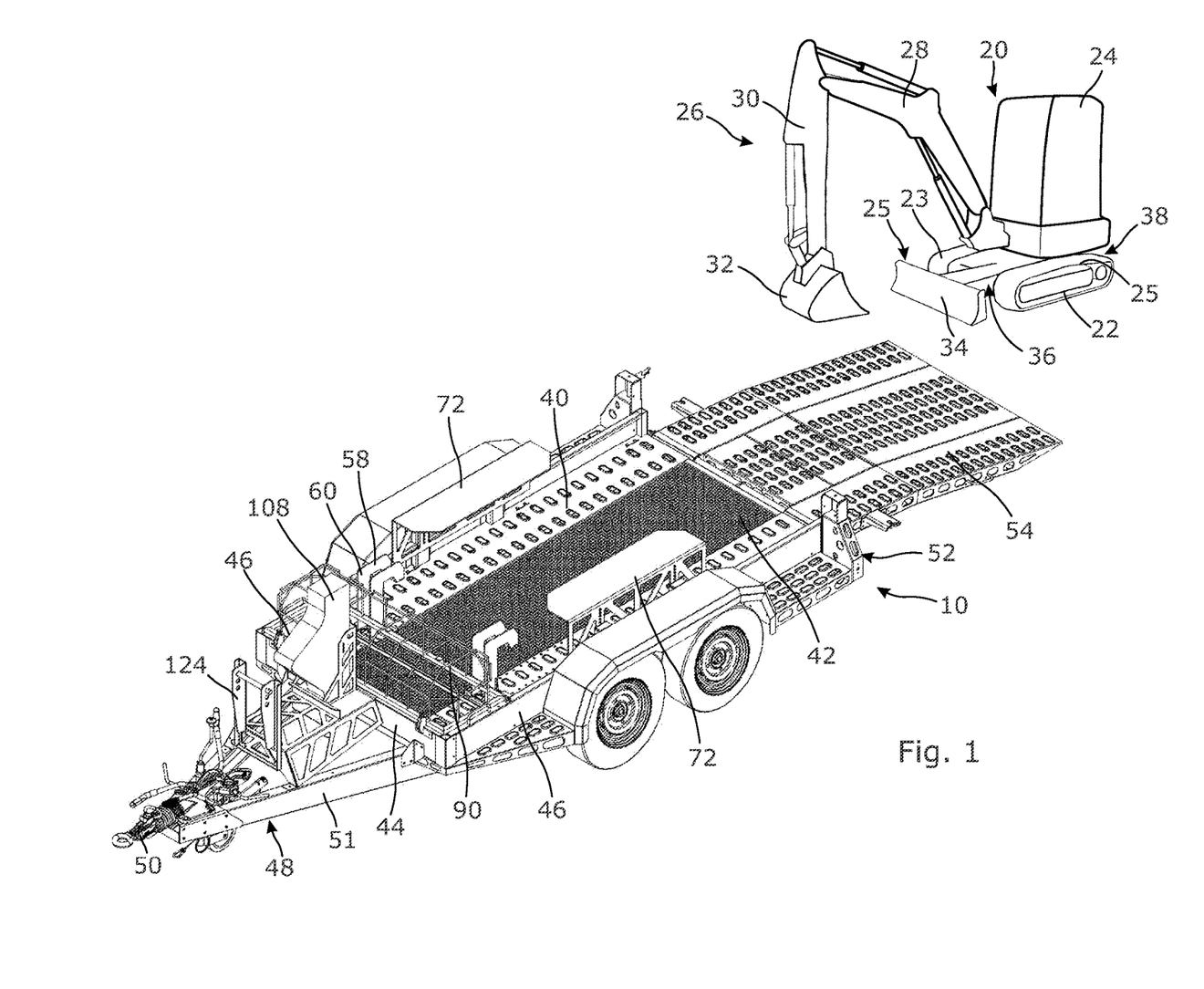
FIG. 1 is a perspective view of a trailer for carrying an excavator according to a preferred embodiment of the present invention and an excavator.
Figure 2:
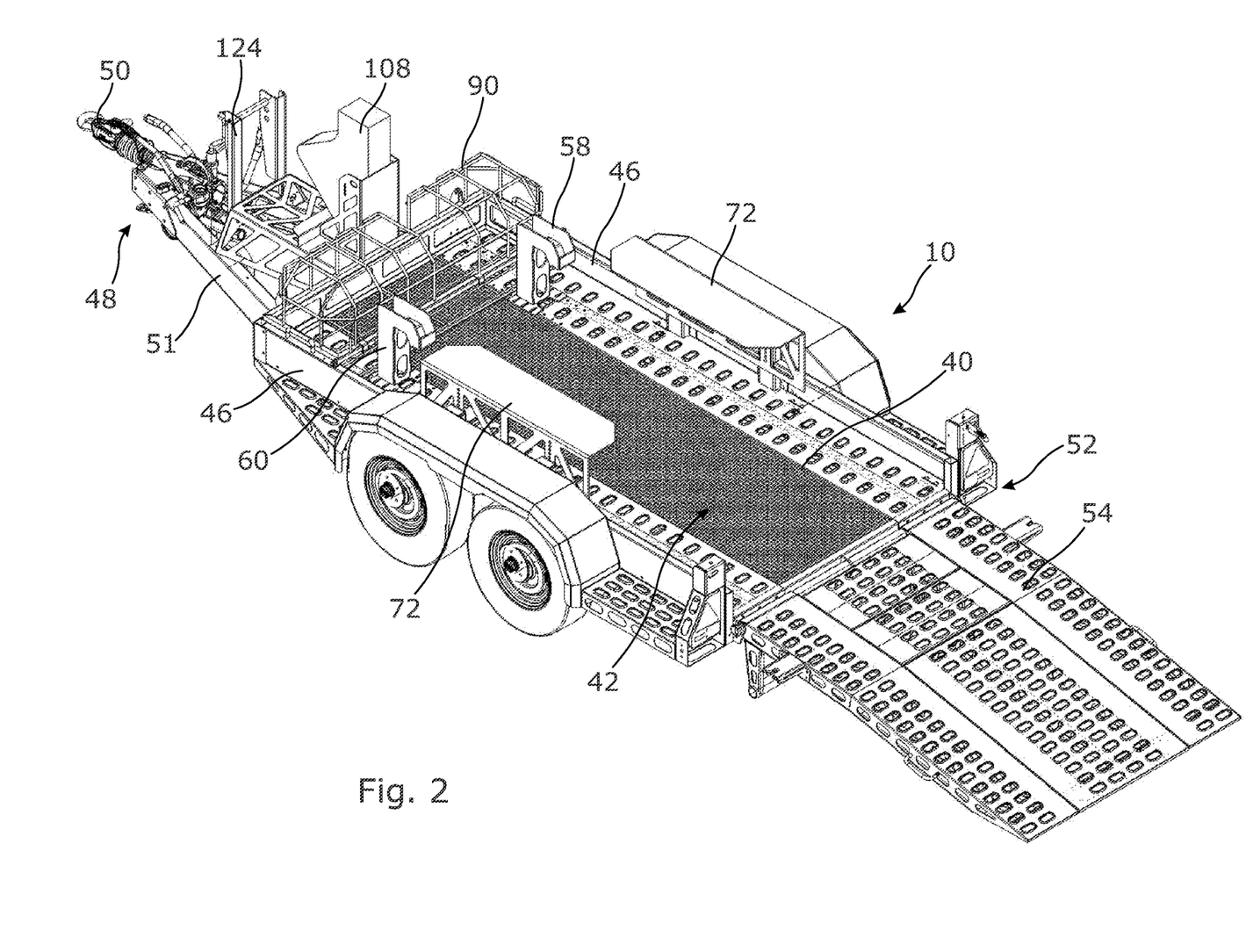
FIG. 2 is a perspective view from the rear of the trailer of FIG. 1.

FIGS. 1 and 2 show a trailer 10 according to the present invention. The trailer 10 is designed to safely transport an excavator or similar plant machinery, together with associated equipment and attachments such as buckets, breakers and the like. The excavator will typically be a compact excavator or mini excavator, having a weight of less than about 8.5 tonnes (otherwise referred to as a digger excavator or mini digger).

As shown in FIG. 1, an example compact excavator 20 comprises a tracked undercarriage 22, a cab 24 which is rotatably mounted on the undercarriage 22 and a workgroup 26, which comprises a boom 28, a dipper or arm 30 and an attachment in the form of a bucket 32. Other examples of compact excavators may include a wheeled undercarriage rather than a tracked undercarriage. A compact excavator may include other attachments such as an auger or a breaker. It will be appreciated that only one attachment will be connected to the end of the arm at any one time. As such, it may be necessary to store or transport one or more additional or alternative attachments together with the compact excavator.

The compact excavator 20, hereafter referred to simply as the excavator 20, further comprises a dozer blade 34 attached to the undercarriage 22. The dozer blade 34 is configured for levelling and moving material. The dozer blade 34 may alternatively be referred to as a backfill blade or simply a blade.

The dozer blade 34 is attached at a front end 36 of the undercarriage 22. The cab 24 is rotatable on the undercarriage 22 such that in a first forward-facing position the workgroup 26 extends beyond the front end 36 of the undercarriage 22 and in a second rear-facing position the workgroup 26 extends beyond an opposite rear end 38 of the undercarriage 22.

In the following description references to a front or a forward end of the excavator 20 will be references to the front end 36 of the undercarriage 22 and the dozer blade 34 and references to a rear or rearward end of the excavator 20 will be references to the rear end 38 of the undercarriage 22, regardless of the direction of the cab 24 and workgroup 26 relative to the undercarriage 22. Similarly, references to driving or moving the excavator 20 in a forward direction are references to the excavator 20 moving in a direction such that the front end 36 of the undercarriage 22 is a leading end of the excavator 20 and references to driving or moving the excavator 20 in a rearward direction are references to the excavator 20 moving in a direction such that the rear end 38 of the undercarriage 22 is a leading end of the excavator 20.

As shown in FIGS. 1 and 2, the trailer 10 comprises a generally rectangular platform or bed 40 including a floor 42, a front end wall 44 and two side walls 46. A front end 48 of the trailer 10 includes a hitch 50 for coupling the trailer 10 to a driven vehicle, such as a car or van. A rear end 52 of the trailer 10 comprises a tailgate or ramp 54. In this embodiment a first end of the ramp 54 is hingedly attached to a rear edge of the floor 42. When the ramp 54 is in a lowered position, as illustrated, a second end of the ramp 54 is in contact with the ground on which the trailer 10 is standing. With the ramp 54 in the lowered position an excavator 20 may be driven onto the trailer 10 by being driven up the ramp 54 and onto the floor 42 of the trailer 10. During transportation the ramp 54 is preferably moved into a raised position in which the second end of the ramp 54 is raised off the ground and the second end of the ramp 54 is disposed substantially vertically above the rear end of the trailer platform 40. In use, when an excavator 20 is seated on the floor 42 of the trailer 10, the ramp 54 is preferably placed into its raised position such that the ramp 54 may provide a stop to limit rearward movement of the excavator 20 on the trailer 10.

Figure 3:
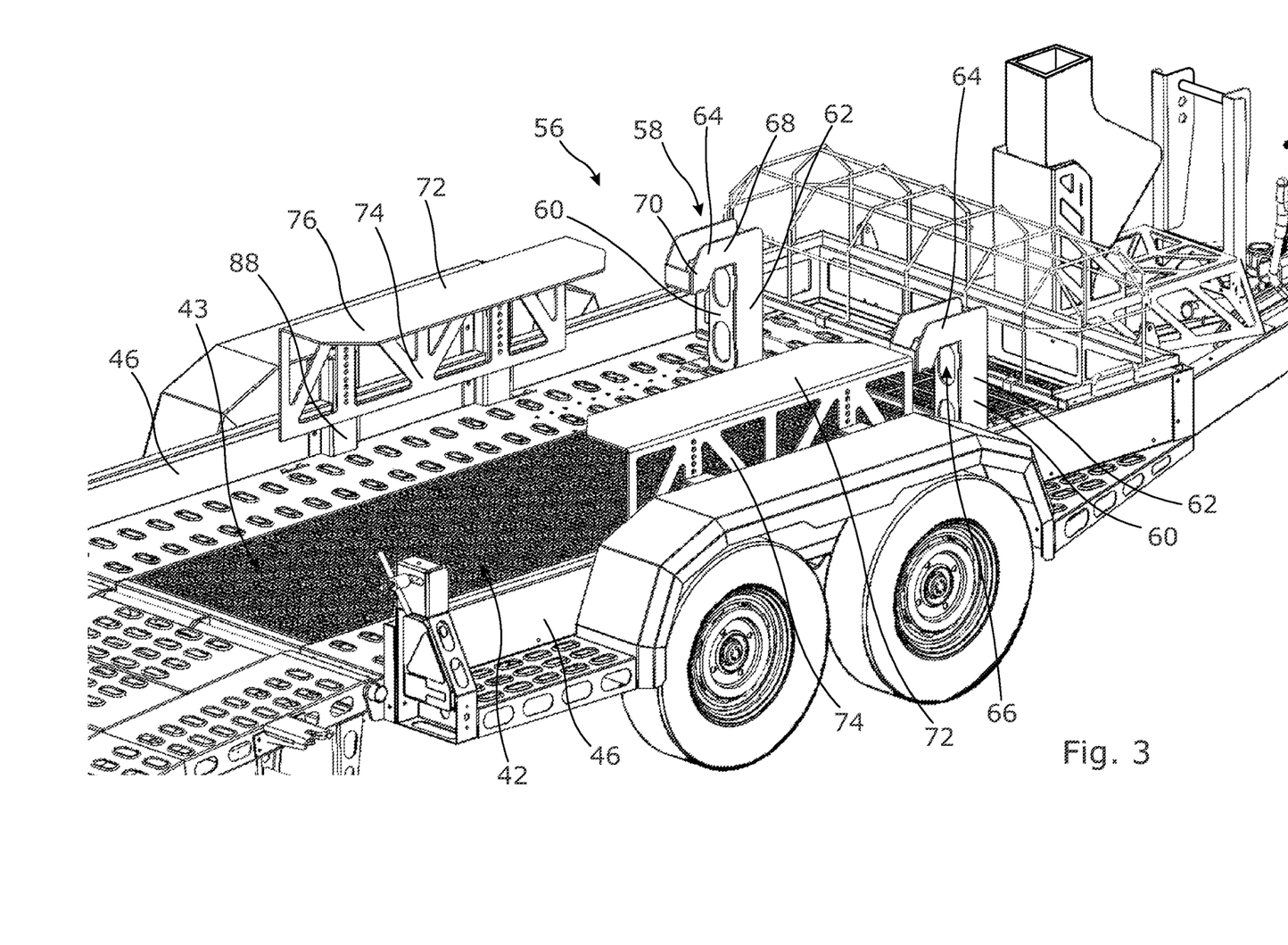
FIG. 3 shows a securing system for securing the excavator to the trailer according to a preferred embodiment of the present invention.
Figure 4:
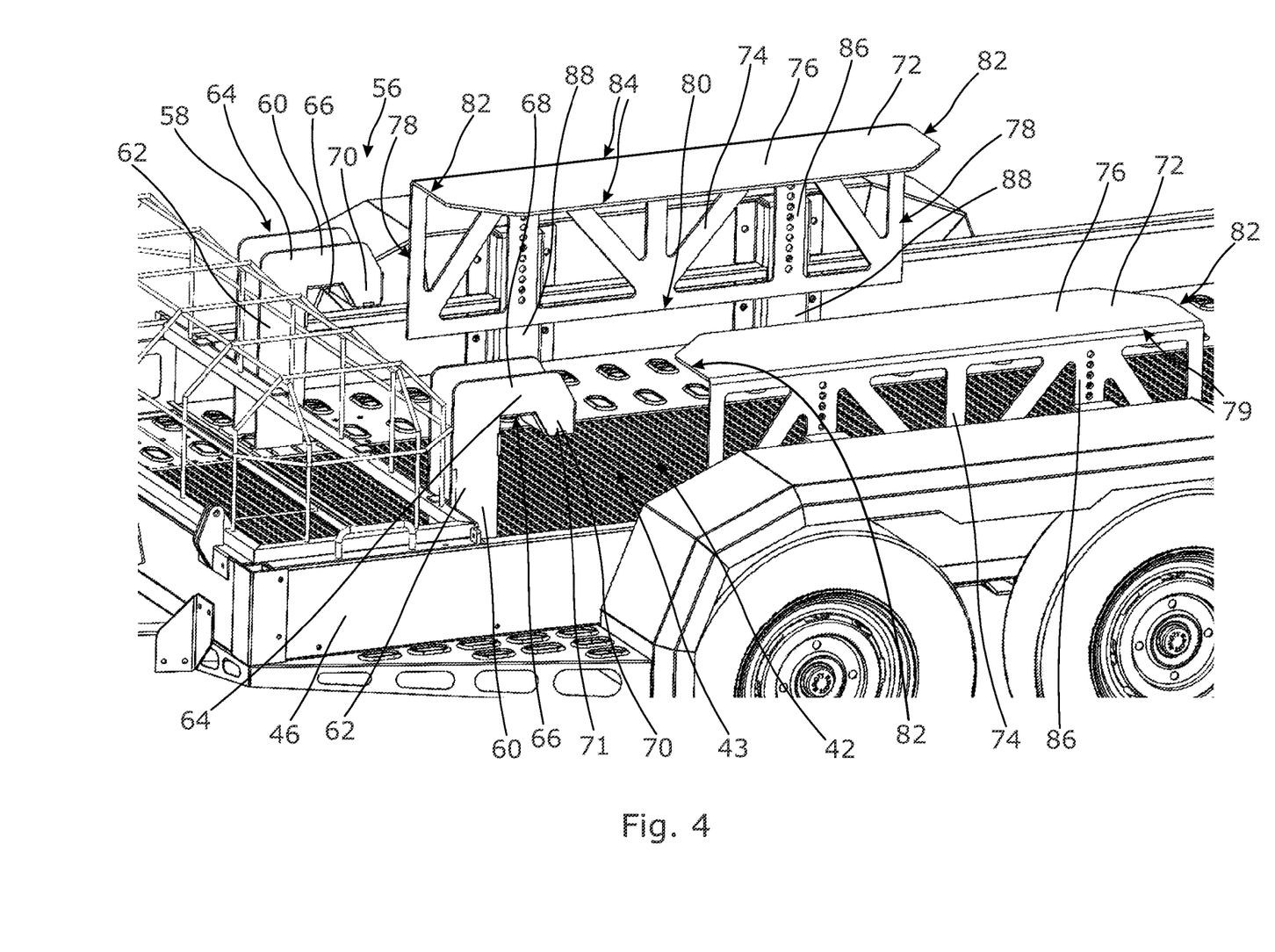
FIG. 4 is a further view of the securing system of FIG. 3.

The trailer 10 further comprises a securing system 56 for securing the excavator 20 to the trailer 10, as shown most clearly in FIGS. 3 and 4. In particular the securing system 56 is configured to restrict forward and upward movement of the excavator 20 relative to the platform 40 of the trailer 10. The securing system 56 may also restrict rearward movement of the excavator 20 relative to the platform 40.

The securing system 56 comprises a retainer 58 configured to engage with the dozer blade 34 of the excavator 20 when the excavator 20 is loaded onto the trailer 10. In this embodiment the retainer 58 comprises a hook member 60. The hook member 60 includes an upright post 62 that extends from an upper surface 43 of the floor 42 of the trailer 10, and a projection 64 that extends from an upper end of the post 62. The projection 64 includes an angled portion so as to define a recess 66 for receiving an upper edge 35 of the dozer blade 34. In the illustrated embodiment the projection 64 includes a first, proximal portion 68 that extends substantially horizontally from the post 62 in a direction towards the rear of the trailer 10, and a second, distal portion 70 that extends from the proximal portion 68 in a direction generally towards the floor 42 of the trailer 10. An end 71 of the distal portion 70 is spaced from the upper surface 43 of the floor 42 of the trailer 10.

Preferably a first distance is defined between the upper surface 43 of the floor 42 of the trailer 10 and the end 71 of the distal portion 70 of the hook member 60, and a second distance is defined between the upper surface 43 of the floor 42 of the trailer 10 and the proximal portion 68 of the hook member 60, the first distance being less than the second distance. The first distance is such that, when an excavator 20 is seated on the trailer 10, the dozer blade 34 can pass under the distal portion 70 of the hook member 60 with the dozer blade 34 in a lowered position. The second distance is such that, once the dozer blade 34 is located under the proximal portion 68 of the hook member 60, the dozer blade 34 can be lifted to its raised position. In this position the dozer blade 34 is disposed in the recess 66 of the hook member 60, and the upper edge 35 of the dozer blade 34 is further from the floor 42 of the trailer 10 than the end 71 of the distal portion 70 of the hook member 60. In this way, the distal portion 70 of the hook member 60 acts as a stop to limit movement of the dozer blade 34 (and therefore the excavator 20) in a rearward direction when the dozer blade 34 is engaged with the hook member 60.

It will further be appreciated that engagement of the dozer blade 34 in the recess 66 limits movement of the dozer blade (and therefore the excavator 20) in both a forward and an upward direction, due to the position of the upright post 62 and proximal portion 68 of the projection 64.

In preferred embodiments the retainer 58 comprises a pair of hook members 60 spaced apart across a width of the trailer floor 42. In use, a first one of the hook members 60 is configured to engage with a first part of the dozer blade 34 proximate a first end edge 31 of the dozer blade 34 and a second one of the hook members 60 is configured to engage with a second part of the dozer blade 34 proximate a second end edge 33 of the dozer blade 34. The first and second hook members 60 are preferably identical.

It will be appreciated that the retainer 58 is disposed in a forward region of the trailer 10, proximate the front end of the trailer floor 42. In particular, the retainer 58 is disposed in a position on the trailer 10 such that there is space rearward of the retainer 58 to accommodate the excavator 20 between the retainer 58 and the rear end of the floor 42 of the trailer 10.

In preferred embodiments the securing system 56 further comprises a pair of keepers 72. Each of the keepers 72 is configured to cover a part of the undercarriage 22 of the excavator 20 when the excavator 20 is seated on the floor 42 of the trailer 10. A first keeper 72 is disposed adjacent the first side wall 46 of the trailer 10, and a second keeper 72 is disposed adjacent the second side wall 46 of the trailer 10.

In use, a part of a first track 23 of the excavator 20 (on a first side of the excavator 20) locates below a part of the first keeper 72 and a part of a second track 25 of the excavator 20 (on a second side of the excavator 20) locates below a part of the second keeper 72.

Each keeper 72 comprises a support frame 74 and a cover plate 76. The support frame 74 is substantially planar and has opposite end edges 78 and opposite upper and lower edges 79, 80. In this embodiment the support frame 74 has a generally rectangular perimeter, with a length between the two end edges 78 being greater than a height of the frame 74 between the upper and lower edges 79, 80.

The cover plate 76 extends from the upper edge 79 of the support frame 74 in a direction substantially perpendicular to a plane of the support frame 74. The cover plate 76 extends in a length direction between end edges 82 and in a width direction between side edges 84. In this embodiment a length of the cover plate 76 is the same as a length of the support frame 74 such that first end edges 78, 82 of each of the support frame 74 and cover plate 76 are continuous and second end edges 78, 82 of each of the support frame 74 and cover plate 76 are continuous.

The support frame 74 of each of the keepers 72 further comprises a mounting plate 86. The mounting plate 86 is configured to engage with and connect to a mounting post 88 attached to the trailer 10. Engagement of the mounting plate 86 with the mounting post 88 allows a position of the keeper 72 with respect to the floor 42 of the trailer 10 to be adjusted, for example to accommodate different sizes of excavator undercarriage 22.

In this embodiment the mounting post 88 is attached to one of the side walls 46 of the trailer 10 and extends upwardly from the side wall 46. The mounting post 88 comprises a plurality of holes. Similarly, the mounting plate 86 comprises a corresponding plurality of holes. To adjust the position of the keeper 72 with respect to the trailer floor 42 the mounting plate 86 is moved with respect to the mounting post 88 until the desired position of the keeper 72 is achieved. A suitable fastener is then inserted through an aligned pair of holes in the mounting plate 86 and mounting post 88, to secure the keeper 72 to the mounting post 88.

It will be appreciated that in other embodiments the mounting plate of the keeper may engage in any suitable manner with the mounting post. For example, the mounting post may comprise two or more pegs which may engage in holes in the mounting plate. In other embodiments the mounting plate may comprise a series or slots, rungs or rods that engage with hooks, clips or latches on the mounting post.

In preferred embodiments, due to the elongate shape of the support frame 74 and cover plate 76, the keeper 72 comprises a pair of mounting plates 86 which engage with a corresponding pair of mounting posts 88.

When the keepers 72 are connected to the trailer 10, the cover plates 76 extend towards each other from opposite sides of the trailer 10. The keepers 72 are aligned such that a plane containing front end edges 78, 82 of both of the keepers 72 extends parallel to the front end wall 44 of the trailer 10.

The keepers 72 are disposed rearward of the retainer 58. In other words, the keepers 72 are disposed between the retainer 58 and the rear end 52 of the trailer 10. In this way, when an excavator 20 is loaded onto the trailer 10 in a forwards direction and its dozer blade 34 is engaged with the retainer 58, a part of each of the tracks 23, 25 of the excavator 20 lie adjacent a corresponding one of the keepers 72. In particular the cover plate 76 of each of the keepers 72 extends over a part of a corresponding one of the tracks 23, 25 of the excavator 20.

The cover plates 76 of the keepers 72 therefore restrict or limit movement of the tracks 23, 25 of the excavator 20 in an upward direction relative to the floor 42 of the trailer 10, i.e. in a direction away from the floor 42 of the trailer 10.

Figure 5:
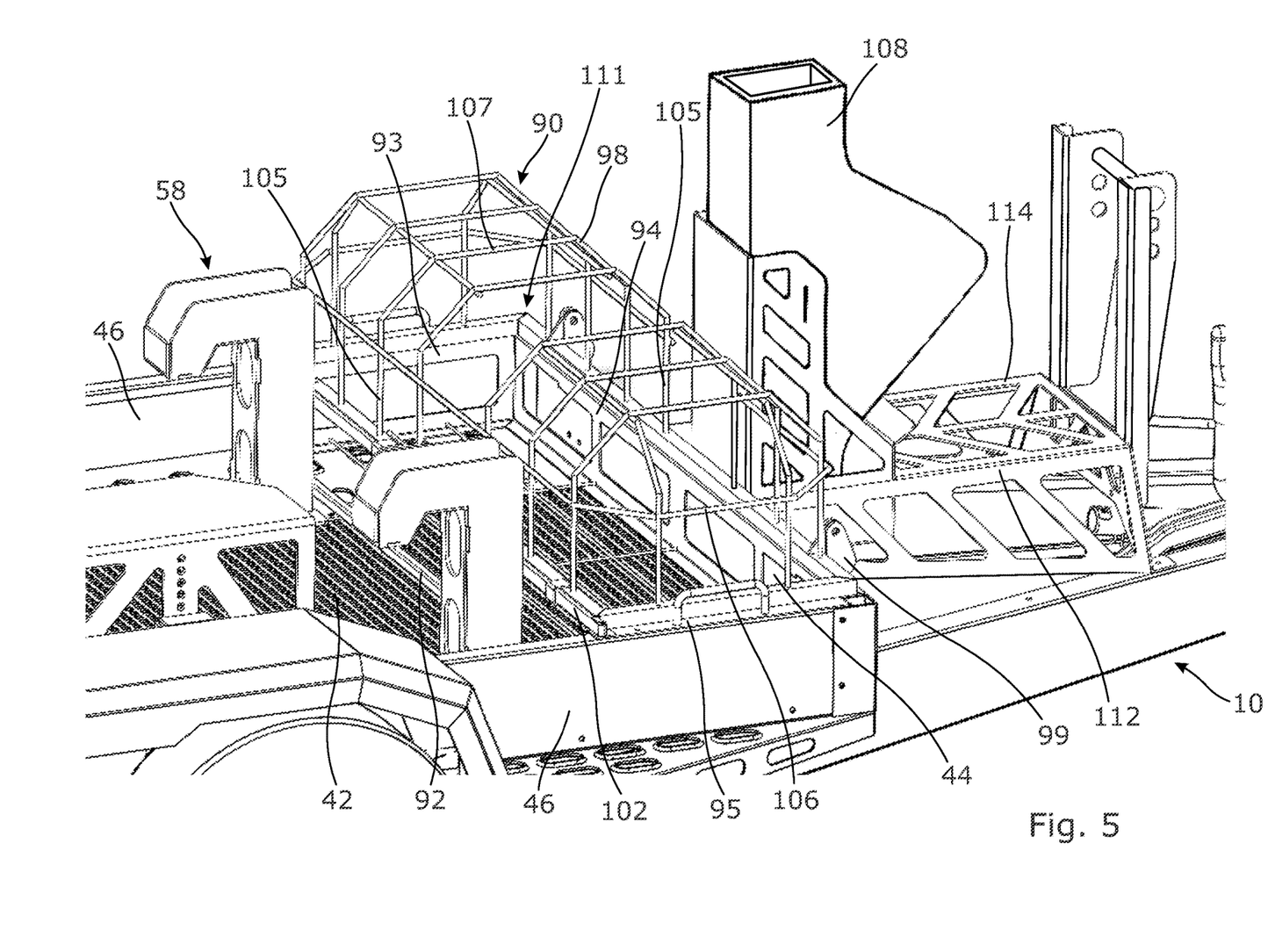
FIG. 5 shows a storage cage, breaker storage and bucket rest in a forward region of the trailer of FIG. 1.
Figure 6:
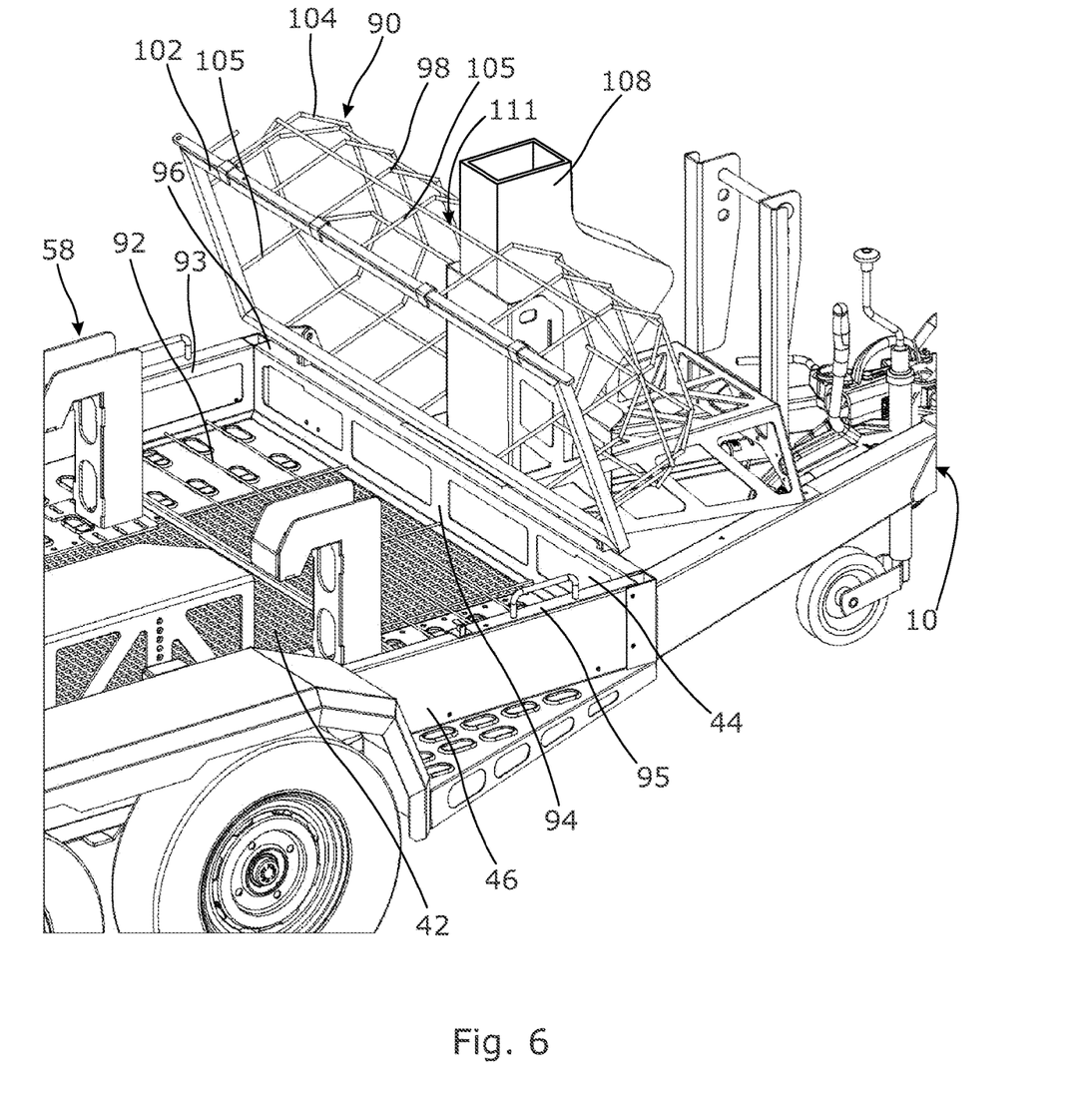
FIG. 6 is a further view of the storage cage, breaker storage and bucket rest of FIG. 5, with a lid of the storage cage in an open position.
Figure 7:
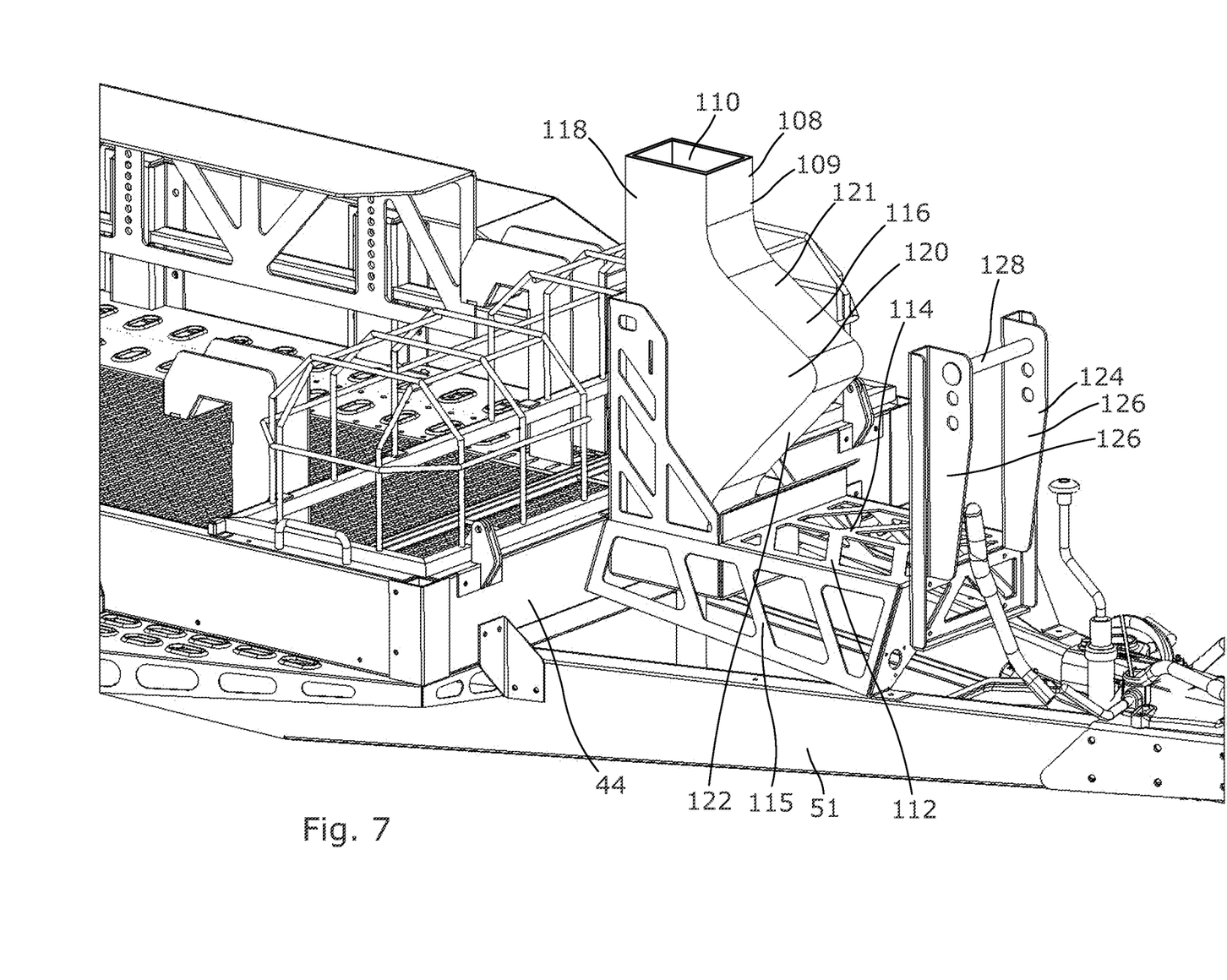
FIG. 7 is a further view of the storage cage, breaker storage and bucket rest of FIG. 5.

The trailer 10 of the illustrated embodiment further comprises a storage cage 90, as shown most clearly in FIGS. 5, 6 and 8. The storage cage 90 is disposed at the front end of the floor 42 of the trailer 10. In this embodiment the storage cage 90 is disposed between the retainer 58 and the front end wall 44 of the trailer 10.

The storage cage 90 comprises a lower portion including a generally rectangular base 92 and three side walls 93, 94 extending from a respective three edges of the base 92. A flange 95, 96 extends outwardly from a top edge of each of the side walls 93, 94. Two end side walls 93 extend from opposite end edges of the base 92, and a distance between these two end side walls 93 is substantially equal to a distance between internal surfaces of the side walls 46 of the trailer 10. A front side wall 94 extends between the two end side walls 93. A height of each of the side walls 93, 94 is substantially the same as a height of a corresponding one of each of the side walls 46 and the front end wall 44 of the trailer 10. In this way, when the storage cage 90 is seated at a front end of the trailer 10, each of the flanges 95, 96 is seated on a respective upper edge of the side walls 46 and front end wall 44 of the trailer 10. In particular, the flanges 95 that project from the two end side walls 93 seat on a top edge of each of the side walls 46 of the trailer 10, and the flange 96 that projects from the front side wall 94 seats on a top edge of the front end wall 44 of the trailer 10.

Each of the base 92 and side walls 93, 94 is preferably formed of a mesh panel or a panel that includes one or more openings. This minimises the weight of the storage cage 90.

The storage cage 90 further comprises a lid 98. In this embodiment the lid 98 is connected to one of the side walls 94 of the storage cage 90 by a hinge 99. As shown most clearly in FIG. 6, the lid 98 is preferably hingedly connected to the flange 96 of the front side wall 94. In preferred embodiments the hinge 99 or each of the hinges that connect the lower portion of the storage cage 90 to the lid 98 comprises a hinge plate 100 that is fixed to the flange 96 of the front side wall 94 (shown in FIG. 8). In particular the hinge plate 100 extends from a free edge of the flange 96 so as to define a channel bounded by the hinge plate 100, the flange 96 and the front side wall 94 of the storage cage 90. When the storage cage 90 is seated in a front region of the trailer 10, the top edge of the front end wall 44 of the trailer 10 is preferably received in the channel. In other words the front side wall flange 96 and hinge plate 100 hook over the top edge of the front end wall 44 of the trailer 10 to couple the storage cage 90 to the front end wall 44 of the trailer 10. This retains the storage cage 90 in a fixed position on the trailer 10.

The lid 98 comprises a generally rectangular frame 102 from which extends a mesh 104 that forms a concave upper portion of the lid 98. The upper portion of the lid 98 comprises two side wall portions 105, two end wall portions 106 and a top wall portion 107. When the lid 98 is in a closed position the frame 102 is seated on the flanges 95, 96 of the lower portion of the storage cage 90. In particular a side member of the frame 102 seats on the flange 96 of the front side wall 94 and two end members of the frame 102 seat on the flanges 95 of the end side walls 93.

The storage cage 90 is preferably sized to house a bucket attachment. The storage cage 90 may also house other types of attachment when they are not attached to the arm 30 of the excavator 20, as well as other equipment.

In the illustrated embodiment the trailer 10 comprises an A-frame 51 between the trailer hitch 50 and the bed 40 of the trailer 10. The trailer 10 further comprises a breaker storage unit or storage apparatus 108. In this embodiment the breaker storage unit 108 is seated on a part of the A-frame 51 adjacent the front end wall 44 of the trailer 10.

The breaker storage unit 108 comprises a housing 109 having an opening 110 in a top wall. The opening 110 is sized to receive at least a part of the breaker so that the breaker may be inserted into the housing 109. The housing 109 is preferably configured and sized such that the breaker is held by the housing 109 in an upright orientation relative to the trailer 10. This allows a breaker that is housed in the breaker storage unit 108 to be connected to and disconnected from the arm 30 of the excavator 20 with the excavator 20 on the trailer 10 without requiring the breaker to be manually lifted into a suitable position.

In particular the breaker storage unit 108 includes means for mounting the breaker storage unit 108 on the trailer 10 such that the opening 110 is uppermost. In this embodiment an axis of the breaker storage unit 108 extends between a first end and a second end of the breaker storage unit 108, and the axis is substantially vertical. The opening 110 is preferably at the first end of the breaker storage unit 108.

To accommodate and house a breaker, the breaker storage unit 108 is preferably elongate in a direction parallel to the axis. Furthermore, a distance between the first and second ends of the breaker storage unit 108 is preferably greater than a maximum dimension of the opening 110. Additionally, in preferred embodiments the opening 110 is rectangular and a cross-sectional shape of the interior volume of the breaker storage unit 108 perpendicular to the axis is substantially rectangular.

Because the breaker storage unit 108 is disposed adjacent the front end wall 44 of the trailer 10, the lid 98 of the storage cage 90 preferably includes a gap or recess 111 for accommodating a part of the breaker storage unit 108 when the lid 98 is open. In particular, and as shown most clearly in FIGS. 6 and 8, when the lid is in the open position the breaker storage unit 108 is received in the gap 111 in the mesh 104 of the lid 98.

As shown most clearly in FIGS. 5 and 8 the illustrated trailer 10 comprises a bucket rest 112 mounted on a part of the A-frame 51. The bucket rest 112 is disposed between the breaker storage unit 108 and the trailer hitch 50. The bucket rest 112 comprises a perforated plate 114 disposed above the A-frame 51. A plane of the perforated plate 114 is substantially horizontal. In use, when an excavator 20 is loaded onto the trailer 10, the arm 30 of the excavator 20 may be maneuvered such that a bucket 32 attached to the end of the arm 30 is seated on the perforated plate 114.

In this embodiment the bucket rest 112 further comprises two side plates or side walls 115 extending from opposite edges of the perforated plate or platform 114. Each of the side plates 115 extends between a part of the A-frame 51 and the perforated plate 114 such that the perforated plate is raised above the A-frame 51. In this embodiment an upper surface of the perforated plate is substantially level with the upper edge of the front end wall of the trailer.

In preferred embodiments the breaker storage unit 108 comprises a projection or protrusion 116 that extends in a direction towards the trailer hitch 50 when the breaker storage unit 108 is mounted on the trailer 10. In the illustrated embodiment the breaker storage unit 108 includes a generally tubular storage portion 118 and the protrusion 116 extends outwardly from a part of the storage portion 118. The tubular storage portion 118 has a generally rectangular cross-sectional shape perpendicular to a longitudinal axis of the storage portion 118 and includes the opening 110 at an upper end. In this embodiment the protrusion 116 has a pair of generally triangular side walls 120 such that the protrusion 116 has a generally triangular shape in a vertical plane. The protrusion 116 further comprises a sloped upper wall 121 and a sloped lower wall 122; the upper wall 121 and the lower wall 122 converging in a direction away from the storage portion 118 to bound edges of the side walls 120. The upper wall 121 and lower wall 122 converge at a distal end of the projection.

The protrusion 116 extends over a part of the bucket rest 112 such that there is a gap between an upper surface of the perforated plate 114 and the lower wall 122 of the protrusion 116. Preferably the breaker storage unit 108 is disposed adjacent a rear edge of the perforated plate 114 such that the protrusion 116 extends over a rear portion of the bucket rest 112. In use, when a bucket 32 is located on the bucket rest 112, a part of the bottom wall of the bucket 32 and the bucket teeth (if present) preferably locate under the protrusion 116, between the protrusion 116 and the bucket rest 112. The protrusion 116 therefore extends into the opening of the bucket 32 and provides a stop that restricts movement of the bucket 32 in an upward direction.

In other embodiments the projection or protrusion may be independent of a storage unit. The projection may, for example, extend from a post or from another structural part of the trailer.

In some circumstances the arm 30 of the excavator 20 does not have an attachment secured to its end. This may be in situations in which a breaker has been stored in the breaker storage unit 108 and/or a bucket 32 has been stored in the storage cage 90. When an excavator 20 is loaded onto the trailer 10 it is desirable to secure the arm 30 of the excavator 20 to prevent unwanted movement or slew during transportation. The trailer 10 therefore preferably further comprises an arm hitch 124.

In this embodiment the arm hitch 124 is attached to a front edge of the bucket rest 112 such that the arm hitch 124 is on an opposite side of the perforated plate 114 to the breaker storage unit 108.

The arm hitch 124 comprises a pair of support members or posts 126 and a retainer bar 128. The support members 126 extend parallel to each other and each support member 126 extends between a first end and a second end. The first end of each of the support members 126 is attached to the bucket rest 112. The support members 126 extend upwardly, in a direction substantially perpendicular to a plane of the perforated plate 114. The retainer bar 128 extends between and joins the support members 126 at their second ends. In use, the end of the arm 30 of the excavator 20 is secured to the retainer bar 128. In particular, a quick release coupling on the excavator arm 30 (used for attaching buckets 32 and the like) may be secured to the retainer bar 128.

The loading and transportation of an excavator 20 on the trailer 10 will now be described with particular reference to FIG. 1.

In use an excavator 20 is driven up the lowered ramp 54 onto the floor 42 of the trailer 10. The excavator 20 is driven in a forward direction such that, when the excavator 20 is on the trailer 10 the dozer blade 34 in located in a forward region of the trailer 10. During loading of the excavator 20 the dozer blade 34 is in a lowered position. The excavator 20 is driven onto the trailer 10 until the dozer blade 34 is adjacent the upright posts 62 of the retainer 58, and the dozer blade 34 is disposed below the projection 64 of the retainer 58.

The excavator 20 is then secured to the trailer 10 by raising the dozer blade 34 such that the dozer blade 34 engages with the retainer 58. In particular, the dozer blade 34 is raised until the upper edge 35 of the dozer blade 34 locates in the recess 66 of the retainer 58.

With the excavator 20 correctly positioned on the trailer 10, and the dozer blade 34 engaged with the retainer 58, the keepers 72 extend over a part of the undercarriage 22 of the excavator 20.

If there is an attachment secured to the end of the arm 30 of the excavator 20 the arm 30 is then maneuvered to stow the attachment in the correct location on the trailer 10. In particular, a breaker attached to the arm 30 may be lowered into the storage portion 118 of the breaker storage unit 108. The arm 30 may then be released from the breaker or may remain attached to the breaker.

A bucket 32 attached to the arm 30 may be lowered onto the bucket rest 112. In particular, in relation to the illustrated embodiment, the bucket 32 may be lowered with the bucket in a first position relative to the arm of the excavator until an edge of the bottom wall of the bucket 32 passes the distal end of the protrusion 116. The bucket 32 may then be rotated into a second position relative to the arm of the excavator such that the bottom wall of the bucket 32 is disposed between the perforated plate 114 and the protrusion 116, and the bucket 32 is seated on an upper surface of the perforated plate 114. The arm 30 may then be released from the bucket 32 or may remain attached to the bucket 32. The bucket 32 is preferably rotated between the first position and the second position. This is necessary because, in this embodiment, a distance between the distal end of the protrusion and the arm hitch 124 is less than a depth of the bucket 32.

Alternatively, an attachment such as a bucket 32 connected to the arm 30 may have been previously detached and housed in the storage cage 90. The excavator arm 30, with no attachment, may then be secured to the arm hitch 124 using the quick release coupling of the arm 30.

The engagement of the dozer blade 34 with the retainer 58 and the positioning of the undercarriage 22 under a part of the keepers 72 secures the excavator 20 to the trailer 10 and prevents forward or upward movement of the excavator 20 relative to the floor 42 of the trailer 10. Preferably, the shape of the retainer 58 is such that a part of the projection 64 of each of the hook members 60 extends over an upper rear region of the dozer blade 34 such that the distal portions 70 of the hook members 60 prevent rearward movement of the dozer blade 34 and the excavator 20.

It will therefore be appreciated that the excavator 20 may be secured to the trailer 10 solely by movement and positioning of the excavator 20 relative to parts of the securing system 56 on the trailer 10. The parts of the securing system 56 remain static and in a fixed position relative to the bed 40 of the trailer 10 during loading of the excavator 20. The securing system 56 does not require any manual adjustment or positioning. This, therefore, decreases the likelihood that the excavator 20 will be incorrectly secured to the trailer 10.

Although in the above embodiment the projection is described as including a proximal portion and a distal portion, in other embodiments the projection may include a single member that extends at an angle from the upright post. The projection may comprise a curved member.

In yet further embodiments the retainer may have a different configuration to that described above. The retainer may include a slot which is configured to receive the dozer blade. The slot may be arranged such that the dozer blade is engaged with the slot by lowering the dozer blade. When the dozer blade is engaged in the slot, a capping portion of the retainer may extend over the upper edge of the dozer blade.

The securing system and trailer of the present invention may be used to transport other items of plant machinery, other than the excavator described above. For example, the securing system may be configured to secure a skid steer loader or a (mini) dumper truck, or other similar plant machinery.

Other modifications and variations not explicitly disclosed above may also be contemplated without departing from the scope of the invention as defined in the appended claims.

The invention claimed is:

1. A method of securing an item of plant machinery to a trailer using a static retainer, the plant machinery comprising an undercarriage and a dozer blade, the method comprising:
  driving the plant machinery onto a floor of the trailer in a forwards direction with the dozer blade forwards of the undercarriage and with the dozer blade in a first, lowered position relative to the undercarriage, such that the dozer blade passes under an angled hook portion and a horizontal projection of hook members of the static retainer located in a forward region of the trailer, wherein:
    the hook members of the static retainer comprise a first hook member and a second hook member separate from the first hook member;
    the first hook member is proximate a first side of the trailer and the second hook member is proximate a second side of the trailer opposite the first side;
    each of the hook members include:
      an upright support post extending vertically from the floor of the trailer;
      a horizontal projection extending from an upper end of the upright support post towards a rear of the trailer; and an angled hook portion extending from the horizontal projection towards the floor of the trailer, such that:
a tip of the angled hook portion is located closer to the floor of the trailer than the horizontal portion;
a space below the horizontal portion and the angled hook portion of each of the hook members is open to the floor of the trailer, such that each of the hook members is configured to accommodate dozer blades of different heights; and
engaging the dozer blade with the static retainer by moving the dozer blade into a second, raised position relative to the undercarriage, such that the dozer blade engages with the horizontal projection of the first hook member and the horizontal projection of the second member, wherein:
the engagement of the dozer blade with the static retainer restricts movement of the plant machinery in forward and rearward directions via the angled hook portion and the support post of each of the hook members, and restricts movement of the dozer blade in upwards and downwards directions by the floor of the trailer and the horizontal projection of each of the hook members.

2. A securing system for securing an item of plant machinery having a dozer blade to a trailer comprising:
a static retainer disposed in a forward region of the trailer, the static retainer comprising hook members located in a forward region of the trailer, wherein:
the hook members comprise a first hook member and a second hook member separate from the first hook member;
the first hook member is proximate a first side of the trailer and the second hook member is proximate a second side of the trailer opposite the first side;
each of the hook members includes:
an upright support post extending vertically from a floor of the trailer;
a horizontal projection extending from an upper end of the upright support post towards a rear of the trailer; and
an angled hook portion extending from the horizontal projection towards the floor of the trailer, such that:
a tip of the angled hook portion is located closer to the floor of the trailer than the horizontal portion;
a space below the horizontal portion and the angled hook portion of each of the hook members is open to the floor of the trailer, such that each of the hook members is configured to accommodate dozer blades of different heights;
wherein the static retainer is configured to engage with the dozer blade of the item of plant machinery by:
the plant machinery driving onto the floor of the trailer in a forwards direction with the dozer blade forwards of the undercarriage and with the dozer blade in a first lowered position relative to the undercarriage;
the plant machinery moving the dozer blade into a second, raised position relative to the undercarriage, such that:
the dozer blade engages with the horizontal projection of the first hook member and the horizontal projection of the second member to:
restrict movement of the plant machinery in forward and rearward directions via the angled hook portion and the support post of each of the hook members; and
restrict movement of the dozer blade in upwards and downwards directions by the floor of the trailer and the horizontal projection of each of the hook members.

3. The securing system of claim 2, in which the item of plant machinery is an excavator, a skid steer loader or a dumper truck.

4. The securing system of claim 2, further comprising a keeper configured such that, when the dozer blade of the plant machinery is engaged with the retainer, a part of an undercarriage of the plant machinery locates under a part of the keeper to limit upwards movement of the undercarriage relative to the floor of the trailer.

5. A trailer including the securing system of claim 2.

6. A support structure for an excavator attachment on a trailer, the support structure comprising:
a platform having an upper surface on which a load may be supported in use;
means for securing the platform to a part of a trailer adjacent a bed of the trailer; and
a projection extending over the platform and being spaced from the platform such that a part of a load being supported by the platform disposed between the platform and the projection to limit movement of the load in a direction substantially perpendicular to a plane of the platform,
wherein the projection comprises a sloped lower wall and a sloped upper wall, the sloped lower wall having a distance between a first part of the projection and an edge region of the platform being smaller than a distance between a second part of the projection and a central region of the platform, and the upper wall and the lower wall converging such that the projection further comprises a pair of generally triangular side walls extending between the upper wall and the lower wall.

7. The support structure of claim 6, further comprising a storage portion configured to receive a breaker proximate an edge of the platform, and wherein the projection extends from the storage portion.

8. The support structure of claim 6 in which the support structure is a bucket rest.

9. A trailer comprising:
a frame including a hitch;
a bed including a floor for supporting an item of plant machinery; and
the support structure of claim 6 disposed between the bed and the hitch.

10. The trailer of claim 9, in which the projection extends over a rear edge of the platform adjacent the bed of the trailer and in a direction towards the hitch.

* * * * *